(12) United States Patent
Datta et al.

(45) Date of Patent: Oct. 6, 2015
(10) Patent No.: US 9,151,387 B2

(54) ULTRA-HIGH VACUUM METALLIC SEAL

(75) Inventors: Amitava Datta, East Greenwich, RI (US); Hai-Ping Ma, Lincoln, RI (US); Jeremy Payne, New Haven, CT (US)

(73) Assignee: Parker-Hannifin Corporation, Cleveland, OH (US)

(*) Notice: Subject to any disclaimer, the term of this patent is extended or adjusted under 35 U.S.C. 154(b) by 1902 days.

(21) Appl. No.: 12/354,578

(22) Filed: Jan. 15, 2009

(65) Prior Publication Data

US 2009/0179389 A1 Jul. 16, 2009

Related U.S. Application Data

(60) Provisional application No. 61/021,067, filed on Jan. 15, 2008.

(51) Int. Cl.
*F16J 15/08* (2006.01)

(52) U.S. Cl.
CPC ........ *F16J 15/0887* (2013.01); *Y10T 29/49995* (2015.01)

(58) Field of Classification Search
USPC .................. 277/608, 626, 644, 647
See application file for complete search history.

(56) References Cited

U.S. PATENT DOCUMENTS

| | | | |
|---|---|---|---|
| 3,713,660 A * | 1/1973 | Luthe ........................ 277/644 |
| 6,042,121 A | 3/2000 | Ma et al. |
| 6,357,759 B1 * | 3/2002 | Azuma et al. ............... 277/602 |
| 6,357,760 B1 | 3/2002 | Doyle |
| 6,409,180 B1 | 6/2002 | Spence et al. |
| 6,688,608 B2 | 2/2004 | Doyle |
| 6,905,125 B2 | 6/2005 | Shibata et al. |
| 7,100,925 B2 | 9/2006 | Swensen et al. |

* cited by examiner

*Primary Examiner* — Vishal Patel
(74) *Attorney, Agent, or Firm* — Renner, Otto, Boisselle & Sklar, LLP

(57) ABSTRACT

A metallic seal design that reduces manufacturing costs by minimizing production steps and also lowers the sealing force by incorporating a thin-wall, high height/width ratio annular column. The seal has two horizontal ribs which constrain the thin-wall column from unstable buckling to thereby reduce or eliminate the tendency of the sealing dams to become inclined to sealing flange surfaces.

9 Claims, 5 Drawing Sheets

ULTRA-HIGH VACUUM METALLIC SEAL

RELATED APPLICATIONS

This application claims the benefit of U.S. Provisional Application No. 61/021,067 filed Jan. 15, 2008, which is hereby incorporated herein by reference.

FIELD OF THE INVENTION

The present invention generally relates to a seal for creating a seal between a pair of sealing surfaces and, more specifically, to a metallic seal.

BACKGROUND OF THE INVENTION

Elastomeric seals generally are not suitable for ultra high vacuum (UHV) sealing applications because of the inherent open structure of polymeric chains through which molecular gaseous species can diffuse. The lowest achievable He leak rate through elastomeric seals is typically $10^{-8}$ cc/sec. Using metallic seals, He leak rates in the range of $10^{-9}$-$10^{-11}$ cc/sec can be easily obtained. Metallic seals, however, generally require high sealing force ($F_s$) also referred to as mechanical contact pressure $P_{mc}$ where $P_{mc}=F_s/A_s$ and $A_s$ is the area of the sealing dam. If $P_{mc}$ exceeds the yield strength of the sealing flange material, flange surfaces can be brinelled when they compress the metallic seal between them to achieve UHV. If brinelled, the flange surfaces will typically require reconditioning before installing new seals. Therefore, metallic seals have been designed to reduce the force required to compress the seal by optimizing seal cross section.

Metallic seals can also offer a longer seal life compared to elastomeric seals in applications where process chemicals would otherwise degrade an elastomeric material, for example in semiconductor processing applications. Elastomeric seals are attacked by highly reactive radicals such as $NF_3$ and $O_2$ which severely damage the polymeric chain structure thereby limiting the seal life. Metallic seals made from nickel, aluminum, tin, and/or stainless steel, for example, can be used in appropriate environments in which specific alloys are found inert. Because of extremely low leakage characteristics, metallic seals are often used to seal poisonous gases, such as $PH_3$ commonly used in semiconductor processing. Metallic seals of appropriate design can achieve leak rates even lower than welded joints. For example, He can have a higher molecular diffusion rate through weld defects than through a metallic seal due to micro cracks, grain boundaries and/or porosity of the welds.

U.S. Pat. No. 6,409,180 to Spence et al. ("Spence") discloses a UHV metallic seal design similar to the one shown in FIG. 1. The Spence seal consists of four sections: two beams 1 and 2, a column 3, two diagonal braces 4 and 5, and two sealing dams 6 and 7. The diagonal brace angle is 35 to 55 degrees. An recessed surface ABC between beams 1 and 2 forms variable width column 3 having a minimum width at the center.

When the flanges 9 and 10 compress the seal, the seal height is reduced as the column 3 undergoes stable buckling maintaining the sealing dam surfaces 6 and 7 parallel to the sealing surfaces of flange 9 and 10, as illustrated in FIG. 2.

A number of steps are typically necessary for machining the Spence seals from a hollow tube. For example, and with reference to FIG. 3, one method of making the Spence seal may include:
(i) machining an annular recessed surface ABC with a tool T1 having the desired profile;
(ii) sectioning the individual seals,
(iii) machining the first sealing dam with a second tool T2; and
(iv) machining the second sealing dam.

An alternative method might include:
(i) machining the annular recessed surface ABC with a first tool T1;
(ii) machining another annular recess with a second tool T2 to form the sealing dams; and
(iii) sectioning individual seals.

There are several disadvantages of the Spence seal design. For example, the large number of machining steps can increase production cost, and the variable thickness column including the braced section requires a high sealing force ($F_s$) and $P_{mc}$ which can cause brinelling of the sealing surfaces of the flanges.

SUMMARY OF THE INVENTION

The present invention includes a seal design that reduces manufacturing costs by minimizing production steps and also lowers the sealing force by incorporating a thin-wall, high height/width ratio annular column. The seal has two horizontal ribs which constrain the thin-wall column from unstable buckling to thereby reduce or eliminate the tendency of the sealing dams to become inclined to sealing flange surfaces.

Accordingly, a metallic seal for sealing axially facing surfaces comprises an annular column portion surrounding a central axis and having at opposite axial ends respective sealing dams for engaging the axially facing surfaces to be sealed. At least two ribs extend radially from the annular column portion, the ribs being axially spaced apart from each other and each pair of ribs defining therebetween an annular recess. The ribs are spaced at a pitch having a length generally corresponding to an axial length of the metallic seal divided by the number of ribs. For example, for a seal having a length L and two ribs the pitch of the ribs would be L/2.

More particularly, the recess can be generally U-shape, and the ribs can extend perpendicular to the central axis. The annular column portion can extend axially beyond respective axially outermost ribs thereby forming recesses that correspond in shape to one half of the annular recess. The annular column portion can have radially inner and outer surfaces defining a column width therebetween, the column width being substantially uniform along the height of the annular column portion, and the column portion may have a height/width ration of about seven or greater. At least one rib can have a thickness dimension in the axial direction that is about equal to or greater than a radial width of the column. The respective sealing dams can be in axial alignment with the annular column portion and may have a radial width between about 0.008 and 0.016 inches.

In accordance with another aspect, a method of making a metallic seal having an annular column portion surrounding a central longitudinal axis with respective sealing dams on ends thereof for sealing axially facing surfaces, and at least two ribs extending radially from the annular column portion is provided. The method includes forming a tubular seal blank having at least three equally axially spaced apart circumferential recesses of essentially the same shape forming therebetween respective radially extending ribs, and severing the tubular seal blank along the axial midpoint of the recesses that have disposed therebetween at least two of the radially extending ribs, to thereby separate at least one metallic seal from the seal blank. The recesses can be U-shape and the ribs can extend perpendicular to the central axis. The recesses can be formed by a machining process, for example.

In accordance with another aspect, a metallic seal for sealing axially facing surfaces comprises an annular column portion surrounding a central axis and having at opposite axial ends respective sealing dams for engaging the axially facing surfaces to be sealed, and at least two ribs extending radially from the column portion, the ribs being axially spaced apart from each other and defining an annular recess between each pair of relatively adjacent ribs, and the axial ends of the annular column portion extending axially beyond the respective axially outermost ribs and defining therewith respective recesses relative to the respective sealing dams, and each recess corresponds in shape to one half of the annular recess.

The recess can be generally U-shape, and the ribs can extend perpendicular to the central axis. The annular column portion can have radially inner and outer surfaces defining a column width therebetween, the column width being substantially uniform along the height of the annular column portion. At least one rib can have a thickness dimension in the axial direction that is about equal to or greater than a radial column width.

Further features of the invention will become apparent from the following detailed description when considered in conjunction with the drawings.

DETAILED DESCRIPTION

Figure 1:
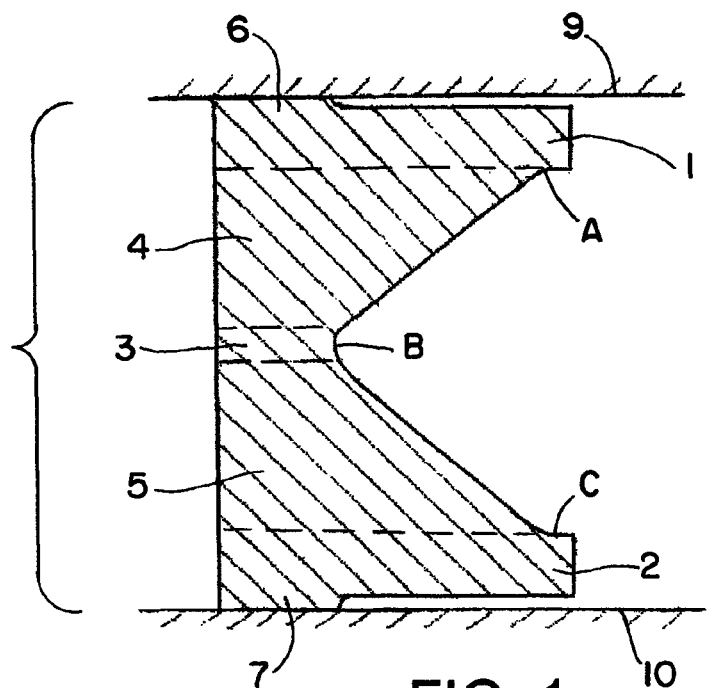
FIG. 1 is a cross-sectional view of prior art metallic seal in an uncompressed state.
Figure 2:
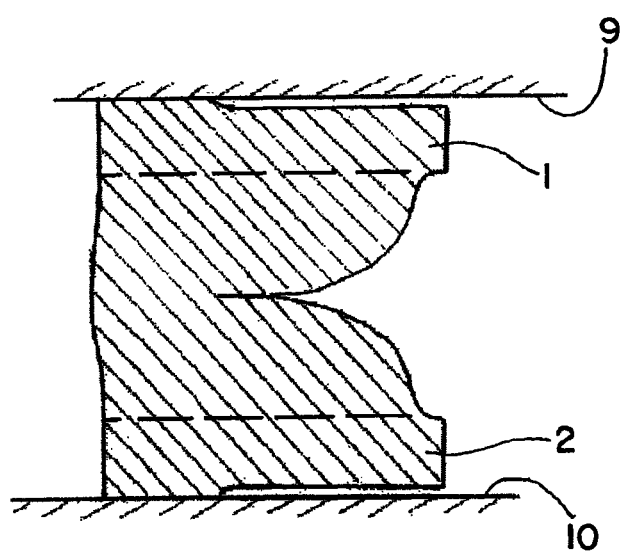
FIG. 2 is a cross-sectional view of the prior art seal of FIG. 1 in a compressed state.
Figure 3:
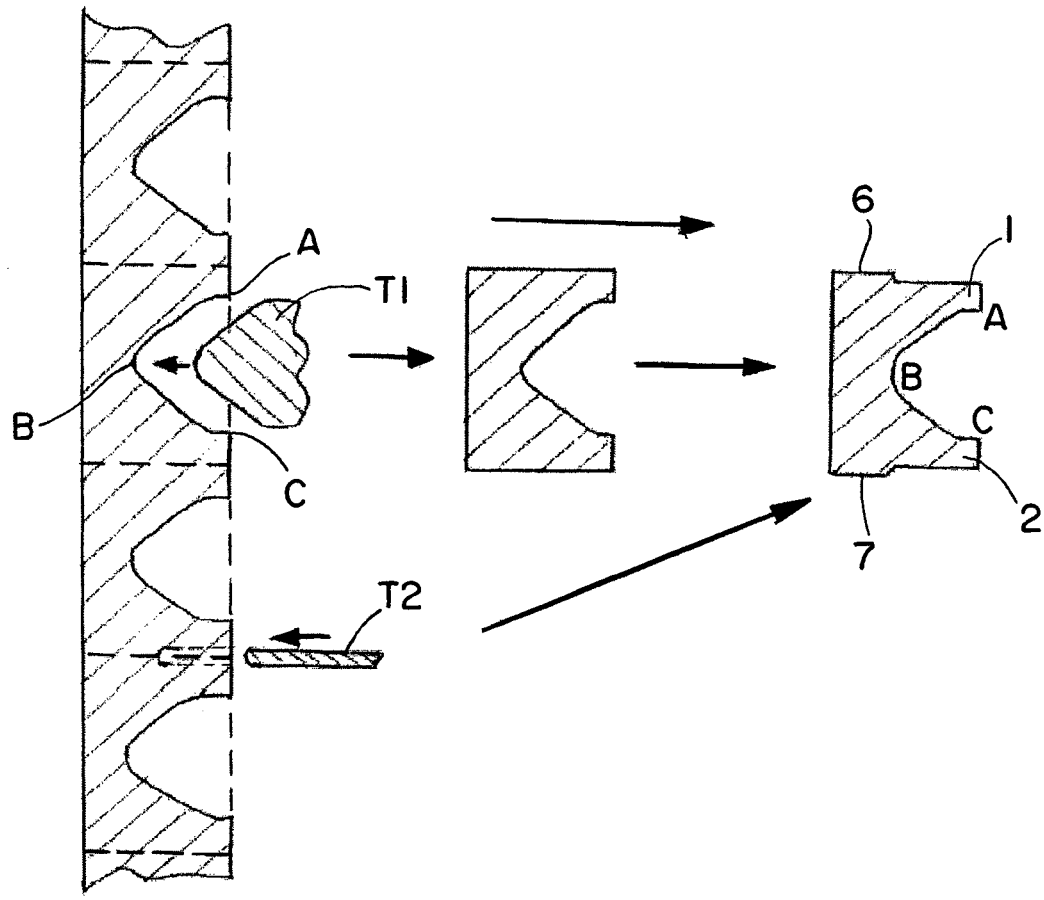
FIG. 3 is a schematic illustration of a prior art method of making the seal of FIGS. 1 and 2.
Figure 4:
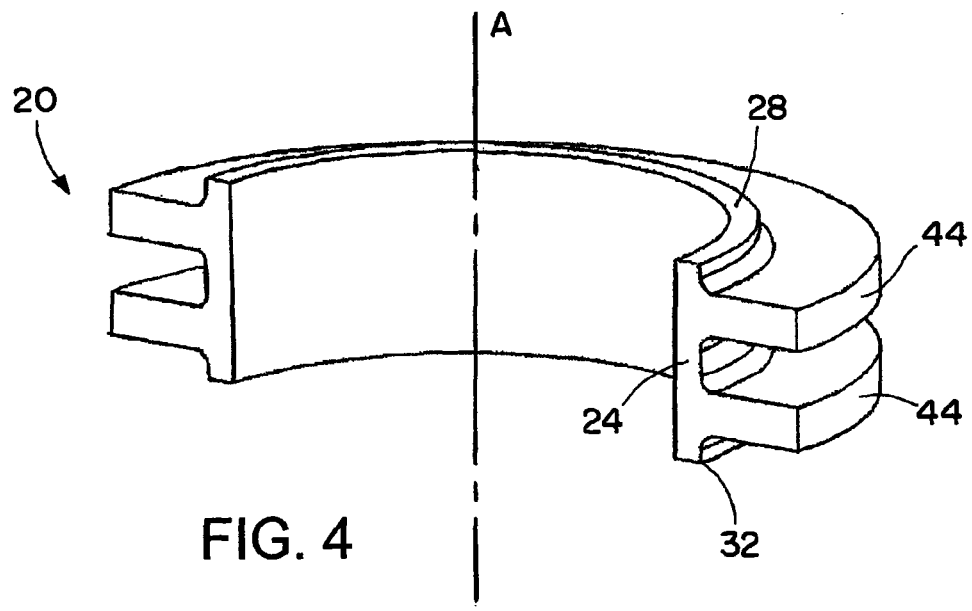
FIG. 4 is a cutaway three-dimensional view of an exemplary metallic seal in accordance with the invention
Figure 5:
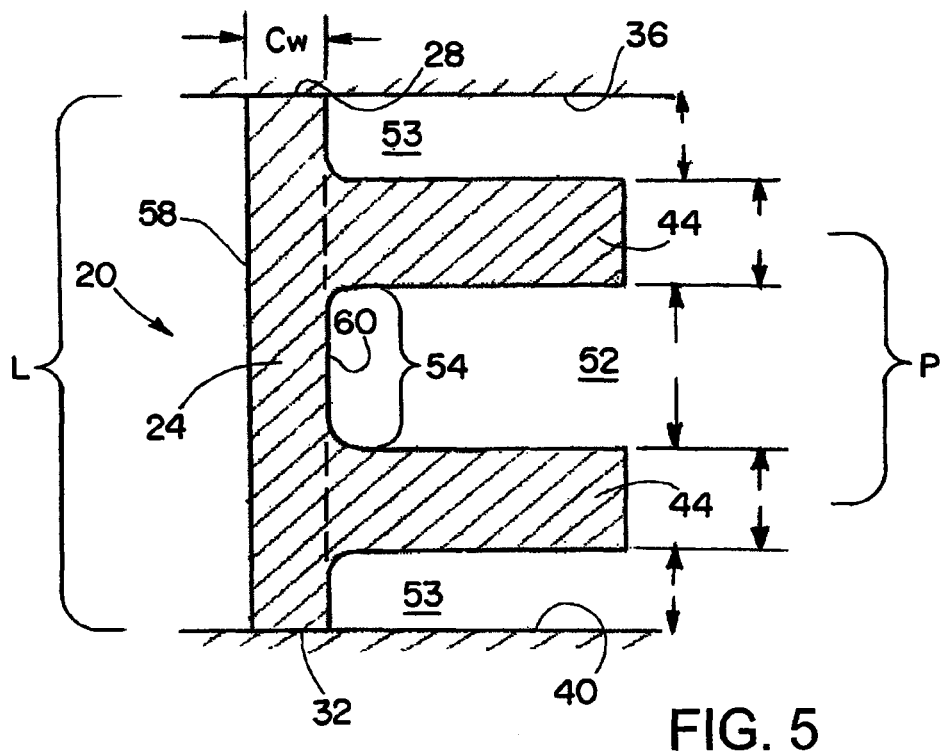
FIG. 5 is a cross-sectional view of the metallic seal of FIG. 4 in an uncompressed state.
Figure 6:
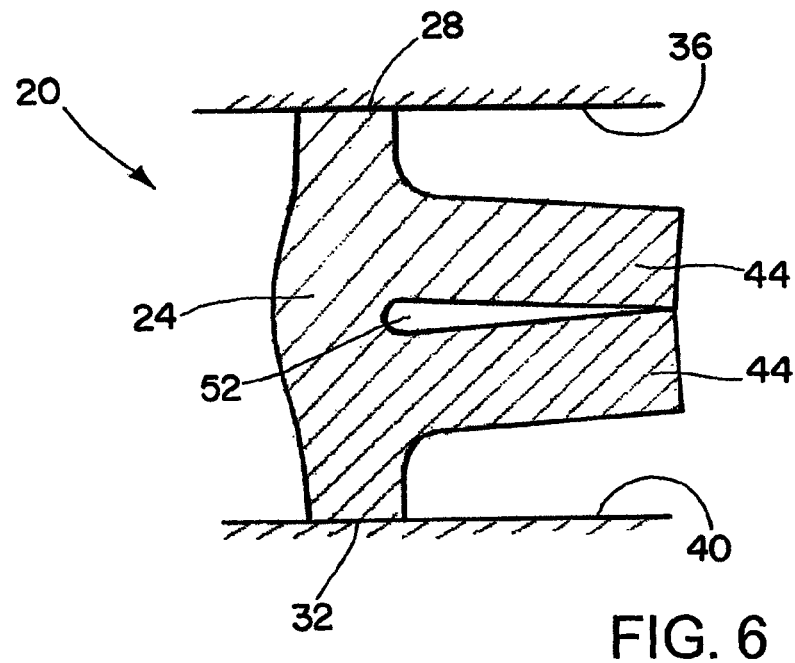
FIG. 6 is a cross-sectional view of the metallic seal of FIG. 4 in a compressed state.

Turning now to FIGS. 4-7, and initially to FIG. 4, an exemplary metallic seal in accordance with the invention is generally indicated by reference numeral 20. The ring shape seal includes an annular column portion 24 surrounding a central axis A and having at opposite axial ends respective sealing dams 28 and 32 for engaging axially facing surfaces to be sealed, which as shown in FIGS. 5 and 6 are sealing flanges 36 and 40. Two ribs 44 extend radially from the column portion 24.

Turning to FIG. 5, the ribs 44 are axially spaced apart from each other and define therebetween an annular recess 52. The recess 52 in the illustrated embodiment is generally U-shape, and the ribs 44 generally extend perpendicular to the central axis A. The column portion extends axially beyond respective ribs 44 and define therewith respective recesses 53 that correspond in shape to one half of the annular recess 52.

As will be appreciated, the ribs 44 are axially spaced apart at a pitch P having a length generally corresponding to an uncompressed axial length L of the metallic seal 20 divided by the number of ribs of the seal. Thus, in the illustrated embodiment, the pitch P is generally equal to about the axial length L divided by two. In a seal having three ribs, the pitch P would be equal to about the axial length L divided by three, and so on for seals of having additional ribs. Thus, the axial extent of a base 54 of the recess 52 in the illustrated embodiment is approximately twice the axial extent of the terminal portions of the column 24 extending axially beyond respective ribs 44 and/or the axial extent of recesses 53.

A radially inner surface 58 and a radially outer surface 60 of the annular column portion 24 define a column width Cw therebetween, with the column width Cw being substantially uniform along the axial length L of the annular column portion 24. Each metallic rib 44 in the illustrated embodiment has a thickness dimension t in the axial direction that is about equal to or greater than the width Cw of the annular column portion 24. As will be appreciated, other dimensions of the annular column portion 24, recess 52, and ribs 44, and/or relationships therebetween, are possible.

The sealing dams 28 and 32 are each in axial alignment with the annular column portion 24, with the column width Cw being the same as the sealing dam width. Thus, the annular column portion 24 virtually extends from one sealing surface to the other sealing surface. This results in a seal 20 having sealing dams 28 and 32 with the same width as constant width column 24 and being in axially alignment therewith.

As will be appreciated, the height/width ratio of the column 24 in the illustrated embodiment is generally the axial length L (height) of the seal divided by the column width Cw (width). Seals in accordance with the invention can have a column height/width ratio of wide range, for example seven (7) or greater. By increasing the height/width ratio of the thin-wall column 24 the sealing force ($F_s$) is reduced for the same amount of compression of the seal free height.

In FIG. 6, the seal 20 is shown in a compressed state with sealing dams 28 and 32 parallel to surfaces 36 and 40 thereby providing a tight seal. The annular column portion 24 is buckled in a controlled manner generally around a midpoint of the axial extent of the recess 52. The controlled buckling maintains the sealing dams 28 and 32 parallel to the sealing surfaces and/or each other to facilitate a tight seal and to reduce or eliminate relative movement between the sealing dams 28 and 32 and surfaces 36 and 40.

Figure 7:
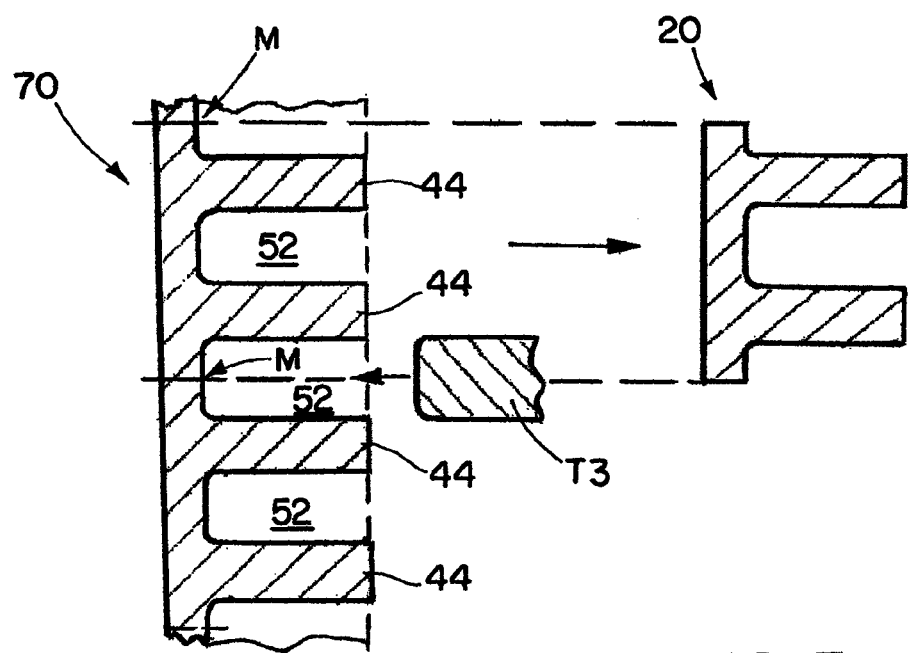
FIG. 7 is a schematic illustration of an exemplary method of making the seal of FIGS. 4-6 in accordance with the invention.

Turning to FIG. 7, a method for making the seal 20 will be described. In general the method begins with forming a tubular seal blank 70 having at least three equally axially spaced apart circumferential recesses 52 of essentially the same shape. The recesses 52 form therebetween respective radially extending ribs 44. As will be appreciated the recesses 52 can be formed by any suitable process, such as by machining, for example. As illustrated, a tool T3 is shown for machining the recesses 52.

Once the tubular blank 70 and/or recesses 52 are formed, the tubular blank 70 is then severed along the axial midpoint M of the recesses 70 that have disposed therebetween at least two of the radially extending ribs 78, thereby separating a metallic seal 20 from the seal blank 70.

Accordingly, the seal 20 can be made in as few as two process steps. First the annular recesses 52 are machined using a single tool, followed by sectioning in the middle of alternate grooves to produce individual seals as illustrated. The resulting seal 20 has an annular outer surface ABC that consists of three sections: one perfectly vertical defining about 50% of the column height, and two perfectly horizontal surfaces extending radially outward defining a part of each rib. Unlike prior art seals that may have a variable column width, seal 20 has a column of uniform width without any diagonal brace section. The annular column width Cw is also the same as the sealing dam width which is in alignment with the annular column 24 such that the column structure (e.g., annular column 24 and sealing dams 28 and 32) virtually extends from one sealing surface to the other sealing surface. This increases the height/width ratio of the thin-wall column and reduces the sealing force ($F_s$) for the same amount of compression of the seal free height.

Figure 8:
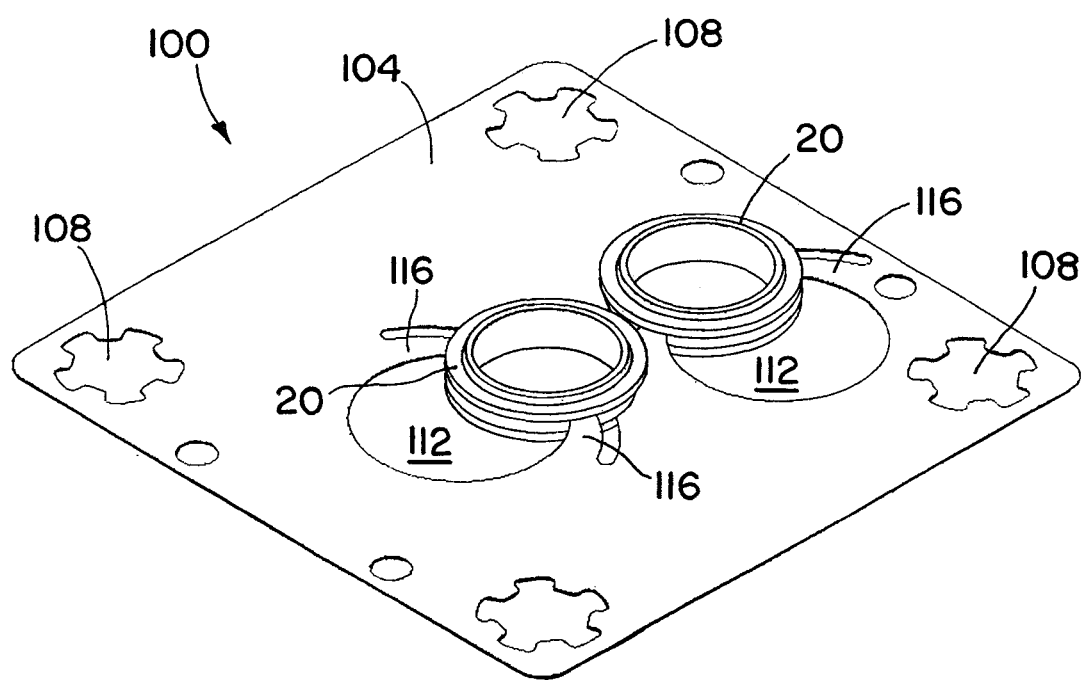
FIG. 8 is a perspective view of a seal assembly including a retainer plate and a pair of exemplary metallic seals in accordance with the invention.

Turning now to FIG. 8, a seal assembly includes a seal retainer 104 and two metallic seals 20. As will be appreciated, the seal retainer 104 supports and locates the metallic seals 20 for ease of assembly. Accordingly, the seal retainer 104 can generally be formed from sheet metal or the like and includes holes 108 through which bolts or other threaded fasteners can pass. The retainer 104 also has cutout portions 112 into which the metallic seal 20 are inserted before being slid into the position shown. Retaining arms 116 are provided for securing the metallic seal 20 in the position shown in FIG. 8. As will be appreciated, the retainer 104 not only supports and locates the metallic seals 20 for ease of assembly, but may also serve as a spacer to prevent overcompression of the metallic seals 20 during assembly.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A metallic seal for sealing axially facing surfaces comprising an annular column portion surrounding a central axis and having at opposite axial ends respective sealing dams for engaging the axially facing surfaces to be sealed, and at least two ribs extending radially from the annular column portion, the ribs being axially spaced apart from each other and each pair of ribs defining therebetween an annular recess, the ribs being spaced at a pitch having a length generally corresponding to an axial length of the metallic seal divided by the number of ribs.

2. A metallic seal as set forth in claim 1, wherein the recess is generally U-shape, and the ribs extend perpendicular to the central axis.

3. A metallic seal as set forth in claim 1, wherein the annular column portion extends axially beyond respective axially outermost ribs forming recesses that correspond in shape to one half of the annular recess.

4. A metallic seal as set forth in claim 1, wherein the annular column portion has a height dimension along the central axis, and wherein the annular column portion has a radially inner surface and a radially outer surface, the inner and outer surfaces defining a column width therebetween, the column width being substantially uniform along the height of the annular column portion.

5. A metallic seal as set forth in claim 1, wherein a height/width ratio of the column portion is about seven or greater.

6. A metallic seal as set forth in claim 1, wherein at least one rib has a thickness dimension in the axial direction that is about equal to or greater than a radial column width.

7. A metallic seal as set forth in claim 1, wherein the respective sealing dams are in axial alignment with the annular column portion.

8. A metallic seal as set forth in claim 1, wherein at least one of the sealing dams has a radial width between about 0.008 and about 0.016 inches.

9. A metallic seal assembly comprising a seal retainer and at least one seal as set forth in claim 1.

* * * * *